United States Patent
Lin et al.

(10) Patent No.: US 6,863,783 B2
(45) Date of Patent: Mar. 8, 2005

(54) METHOD OF PRODUCING ELECTROSTATICALLY CHARGED GELATIN

(75) Inventors: Charles Lin, Decatur, AL (US); Jay Dahlgren, Madison, AL (US); Scott Morris, Chatham, NJ (US); Richard Thompson, New York, NY (US)

(73) Assignee: The Meow Mix Company, Secaucus, NJ (US)

( * ) Notice: Subject to any disclaimer, the term of this patent is extended or adjusted under 35 U.S.C. 154(b) by 107 days.

(21) Appl. No.: 10/294,274

(22) Filed: Nov. 14, 2002

(65) Prior Publication Data

US 2004/0094420 A1 May 20, 2004

(51) Int. Cl.[7] .................................................. B01J 19/08
(52) U.S. Cl. ........................................ 204/164; 361/226
(58) Field of Search ............................... 204/164, 165; 361/226

(56) References Cited

U.S. PATENT DOCUMENTS

| | | | |
|---|---|---|---|
| 2,398,004 A | 4/1946 | Houck et al. | |
| 2,514,635 A | 7/1950 | Gates, Jr. et al. | |
| 2,743,265 A | 4/1956 | Garono et al. | |
| 3,153,030 A | 10/1964 | Consolazio et al. | |
| 3,176,001 A | * 3/1965 | Veis et al. | 530/355 |
| 3,355,445 A | 11/1967 | Kalafatas et al. | |
| 3,886,084 A | * 5/1975 | Vassiliades | 428/402.22 |
| 4,374,063 A | 2/1983 | Consolazio et al. | |
| 5,459,241 A | 10/1995 | Moy et al. | |
| 5,877,287 A | 3/1999 | Lilja et al. | |
| 6,080,843 A | * 6/2000 | Rainville et al. | 530/355 |

FOREIGN PATENT DOCUMENTS

| | | |
|---|---|---|
| JP | 6-108012 A | 4/1994 |
| JP | 6108012 | 4/1994 |

* cited by examiner

*Primary Examiner*—Kishor Mayekar
(74) *Attorney, Agent, or Firm*—Hovey Williams LLP

(57) ABSTRACT

Methods of forming electrostatically charged gelatin are provided. Gelatin is extracted by an acid extraction method (12) thereby producing a gelatin dispersion (14), the pH of which is adjusted to the isoelectric point of the gelatin. The pH of the gelatin dispersion (14) is then further adjusted (22) so as to cause the gelatin to assume an electrostatic charge.

7 Claims, 1 Drawing Sheet

METHOD OF PRODUCING ELECTROSTATICALLY CHARGED GELATIN

BACKGROUND OF THE INVENTION

1. Field of the Invention

The present invention generally concerns methods of forming electrostatically charged gelatin. More specifically, the invention pertains to methods whereby gelatin is extracted from a collagen-containing raw material and processed so as to produce a gelatin product exhibiting an overall positive or negative electrostatic charge based upon the particular processing conditions employed.

2. Description of the Prior Art

Gelatin is a transparent, brittle, essentially odorless and tasteless powder. Gelatin is typically extracted from by-products of the meat industry including pork skin, tendons, ligaments, and bones. Gelatin has been utilized in numerous applications because of its ability to absorb 5–10 times its own weight in water and to form a gel in solutions having temperatures of about 35–40° F. and below. Gelatin has been used in the manufacture of rubber substitutes, adhesives, cements, lithographic and printing inks, plastic compounds, artificial silk, photographic plates and films, matches, light filters for mercury lamps, clarifying agents, hectographic masters, sizing paper, and textiles. The pharmaceutical industry has utilized gelatin as a suspending agent, an encapsulating agent, a tablet binder, and a coating agent.

Gelatin has been used in the food industry as a thickener, a food stabilizer and a food texture enhancer. However, the use of gelatin in the pet food industry has been rare due in part to its expense and the availability of less costly viscosity enhancing agents such as gums derived from plant and vegetable sources. Generally, in food industry applications, gelatin exhibits no net electrostatic charge. The conventional method of extracting food-grade gelatin includes adjusting the pH of the gelatin-containing aqueous dispersion to the isoelectric point of the gelatin. The isoelectric point is the pH at which a material exhibits no net electrostatic charge.

In some food-related applications, it may be desirable to use electrostatically charged gelatin. For example, gelatin having a negative electrostatic charge may be incorporated into hairball-prevention pet food products. In the formation of a hairball, the hair ingested by the animal clings to the lining of the stomach where it becomes entangled with other hairs and undigested food. Hairballs can be very problematic for the animal in that hairballs can lead to diarrhea and vomiting. If the animal were to ingest gelatin having a negative electrostatic charge, the gelatin would attract the hair inside the stomach of the animal and carry it through the animal's digestive system thereby preventing hairball formation.

U.S. Pat. No. 2,398,004 teaches a method of controlling the isoelectric point of gelatin for use in photographic applications. The isoelectric point of the gelatin may be altered by the addition of an alkali to increase the pH of the gelatin solution. This pH is maintained for a period of time and subsequently, the action of the alkali is stopped by the addition of an acid.

U.S. Pat. No. 2,514,635 discloses a method of reducing the viscosity of gelatin, especially photographic gelatin. The method uses an amine and amine salt buffer to raise the pH of the gelatin solution in order to increase the gelatin viscosity.

No method of manufacturing gelatin has thus far been available which would enable the gelatin to assume an electrostatic charge. Therefore, there exists a real and unfulfilled need for a method of producing gelatin having an electrostatic charge and being of food-grade quality.

SUMMARY OF THE INVENTION

The present invention overcomes the above problems and provides methods of forming electrostatically charged gelatin. In a preferred embodiment, a collagen-containing raw material is provided and formed into an aqueous slurry. A gelatin dispersion is formed by extracting gelatin from the slurry at a pH of from about 2–3. A first pH adjustment step is performed whereby the pH of the gelatin dispersion is adjusted to the isoelectric point of the gelatin. Preferably, the gelatin has an isoelectric point of from about 4.5–5.5 and more preferably about 4.6. Non-gelatin impurities are removed from the gelatin dispersion and the pH adjusted a second time in order to cause the gelatin to assume an electrostatic charge.

The step whereby non-gelatin impurities are removed from the gelatin dispersion generally comprises filtering the gelatin dispersion. Preferably, the gelatin dispersion undergoes a first filtration step for removal of insoluble materials such as hair and bone which may have been a part of the collagen-containing raw material from which the initial slurry was formed and the gelatin extracted. After the first filtration, the gelatin dispersion undergoes a second filtration or "ultrafiltration" whereby various non-gelatin protein impurities are removed.

In another preferred embodiment, electrostatically charged gelatin is formed by providing a collagen-containing raw material and forming the raw material into an aqueous slurry. A gelatin dispersion is formed by extracting gelatin from the slurry. During a first pH adjustment step, the pH of the gelatin dispersion is adjusted to the isoelectric point of the gelatin. A second pH adjustment of the gelatin dispersion is performed causing the gelatin to assume an electrostatic charge.

Following the second pH adjustment step, the gelatin dispersion is further purified by removing or neutralizing trace amounts of charged impurities. A preferred method of removing charged impurities such as minerals, ions, and peptides involves passing the gelatin dispersion through either a cation or anion column. If the gelatin is negatively charged, the dispersion is passed through an anion column whereby positively charged impurities are removed. If the gelatin is positively charged, the dispersion is passed through a cation column whereby negatively charged impurities are removed.

Preferably, following passage through the anion or cation column, the electrostatic charge of the gelatin is enhanced by passing a DC electric current through the gelatin dispersion. This enhancement operation enhances the overall electrostatic charge of the gelatin by adding or removing electrons from the gelatin, whichever the case may be. Preferably, the DC electric current, has a voltage of from about 1–100 mV, more preferably from about 5–50 mV and most preferably about 10 mV. The DC current preferably has an amperage of about 1–10 A, more preferably about 2–4 A, and most preferably about 2 A. Preferably, the current is passed through the gelatin dispersion for a period of up to about 45 seconds, more preferably from about 10–40 seconds, and most preferably from about 10–15 seconds. If the gelatin is negatively charged, a negative DC current is passed through the dispersion thereby enhancing the negative charge of the gelatin. If the gelatin is positively charged, a positive DC current is passed through the dispersion thereby enhancing the positive charge of the gelatin.

In yet another preferred embodiment, previously isolated gelatin, that is, gelatin which has been previously extracted and dried into a powder, is formed into an aqueous dispersion. The pH of the gelatin dispersion is adjusted thereby causing the gelatin to assume an electrostatic charge. Moisture is then removed from the gelatin dispersion forming a gelatin concentrate without first neutralizing the gelatin dispersion, that is, the acid or base used to make the pH adjustment is not neutralized prior to moisture removal.

Preferably, once moisture has been removed from the gelatin dispersion, the gelatin concentrate undergoes a sterilization process thereby making the gelatin suitable for use in food products. The gelatin concentrate may be sterilized using any method known to those skilled in the art, however it is preferable to employ a heat sterilization process using superheated steam at a temperature of from about 250°–350° F., more preferably from about 300°–330° F., and most preferably at about 310°–315° F. During the heat sterilization process, the gelatin concentrate is exposed to the superheated steam for about 2–10 seconds.

The pH adjustment step causing the gelatin to assume a negative electrostatic charge comprises adjusting the pH of the gelatin dispersion to between about 9–13, more preferably to between about 10–12, and most preferably to between about 11–12. The pH adjustment step causing the gelatin to assume a positive electrostatic charge comprises adjusting the pH of the gelatin dispersion to between about 1–4, more preferably to between about 1.5–4, and most preferably to between about 2–3. The pH adjustments may be performed by adding to the gelatin dispersion acidic and basic materials known to those skilled in the art. Preferred acids include organic acids such as acetic acid, citric acid, malic acid, fumaric acid, lactic acid and inorganic acids such as sulfuric acid and phosphoric acid. Sulfuric acid is the most preferred acid for lowering the pH of the gelatin dispersion. Preferred bases include alkali and alkaline earth metal carbonates such as sodium carbonate, potassium carbonate, calcium carbonate and alkali and alkaline earth metal hydroxides such as potassium hydroxide and sodium hydroxide. Sodium hydroxide is preferred for raising the pH of the gelatin dispersion.

Once the gelatin has assumed an electrostatic charge and a portion of the gelatin solution moisture has been removed, the gelatin concentrate preferably undergoes a drying process to form a gelatin powder. Any drying process known to those of skill in the art may be used in forming the gelatin powder; however, spray drying and vacuum tray drying are preferred. During the drying process, the moisture content of the gelatin is reduced to between about 6–12% by weight, more preferably to between 10–12% by weight, and most preferably to about 12.0% by weight.

DETAILED DESCRIPTION OF THE PREFERRED EMBODIMENT

Pure gelatin is composition comprising a plurality of amino acids in varying amounts. Table 1 illustrates preferred gelatin compositions for use with the present invention. Amounts of each amino acid are given in the form of a preferred range.

TABLE 1

| Amino acid | Amount (by weight) |
| --- | --- |
| Glycine | 25.50–30.50% |
| Proline | 16.20–18.00% |
| Hydroxyproline | 13.50–14.50% |
| Glutamic acid | 11.00–11.70% |
| Alanine | 8.60–11.0% |
| Arginine | 8.10–9.10% |
| Aspartic acid | 6.20–6.90% |
| Lysine | 4.10–5.20% |
| Valine | 2.50–3.40% |
| Phenylalanine | 2.10–2.50% |
| Leucine | 3.10–3.40% |
| Threonine | 1.90–2.20% |
| Isoleucien | 1.36–1.80% |
| Methionine | 0.80–1.00% |
| Histidine | 0.74–1.00% |
| Tyrosine | 0.20–1.00% |
| Serine | 2.90–4.20% |
| Cystine | 0.05–0.10% |
| Cysteine | 0.05–0.10% |

While not wishing to be, bound by any particular theory, it is believed that the imposition an electrostatic charge on the gelatin involves either the addition or removal of electrons from various groups on at least one of the amino acids which comprise gelatin. If the gelatin is to have a negative electrostatic charge, an electron is added to the carboxyl group of an amino acid while the amino group remains neutral. If the gelatin is to have a positive electrostatic charge, an electron is removed from the amino group of the amino acid while the carboxyl group remains neutral.

Figure 1:
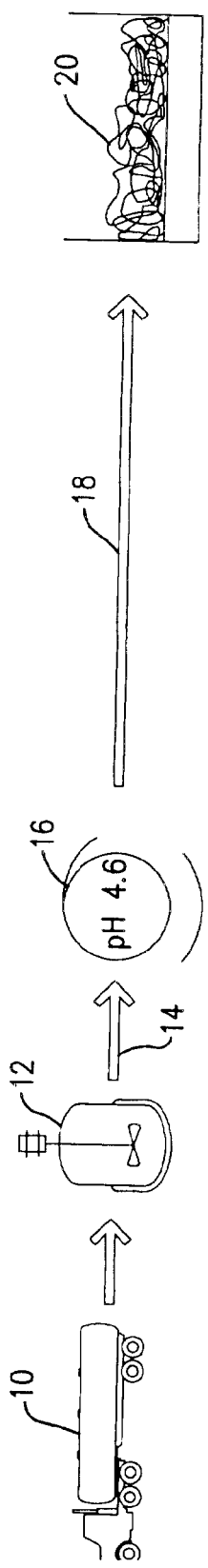
FIG. 1 depicts a prior art process of gelatin extraction whereby electrostatically neutral gelatin is formed.

FIG. 1 depicts a prior art process for producing electrically neutral gelatin. Collagen-containing raw material, typically meat industry by-products, is supplied by a tanker truck 10. The raw material is ground into small particles and fed to an acidic gelatin extraction process 12. During the gelatin extraction process 12, gelatin is extracted from the collagen-containing raw material and a gelatin dispersion 14 is formed. The pH of gelatin dispersion 14 is adjusted to 4.6 and then sent to a filtering process 16 whereby impurities are removed. The filtered gelatin dispersion 18 is sent to a drying operation where moisture is removed and a gelatin powder 20 is formed.

Figure 2:
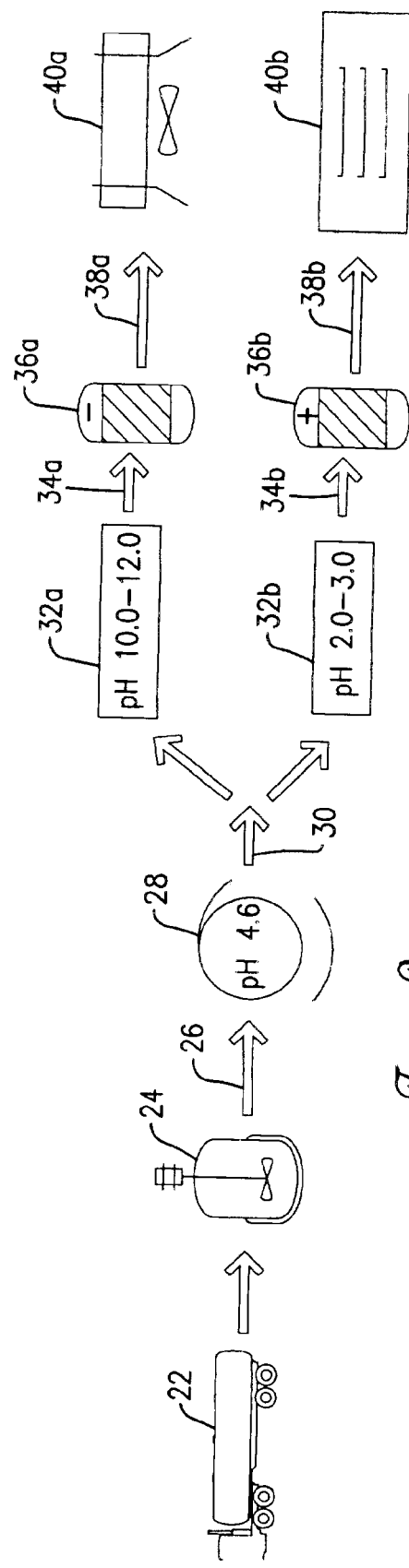
FIG. 2 is depicts a process according to the present invention whereby electrostatically charged gelatin is formed.

FIG. 2 depicts a preferred method of forming electrostatically charged gelatin according to the present invention. Collagen-containing raw material is supplied by tanker truck 22. The raw material is ground into small particles and fed to an acidic gelatin extraction process 24. Water is added to the raw materials to form a slurry and the pH of the slurry is adjusted to about 2.0–3.0 using sulfuric acid. The slurry is maintained in this pH range for a period of up to 4 days at which time the slurry undergoes a series of heating steps and the gelatin is extracted forming a gelatin dispersion 26. The heating steps occur over a 3 hour period whereby the slurry is heated a plurality of times to temperatures of at least 140° F. Following the heating steps, the pH of the slurry is adjusted to 4.6, the isoelectric point of the gelatin, by the addition of sodium hydroxide. At this point, the gelatin bears no electrostatic charge.

The gelatin dispersion 26 then undergoes a filtration operation 28 where impurities are removed. The filtration operation 28 occurs in two stages, the first of which involves removing insoluble materials such as hair and bone which were introduced into the process with the raw materials. The second filtration stage is an "ultrafiltration" stage whereby very fine particles including non-gelatin proteins are removed from the gelatin dispersion 26.

Depending on the electrostatic charge desired, the remainder of the process proceeds in one of two directions. If gelatin with a negative electrostatic charge is desired, the pH of dispersion 30 is adjusted by the addition of sodium hydroxide 32a to between about 10–12. This pH adjustment step causes the carboxyl group of at least one of the amino acids from which gelatin is comprised to assume a negative charge. However, the amino group of the amino acid remains electrostatically neutral. Therefore, the gelatin assumes an overall negative electrostatic charge.

After the pH adjustment step, the negatively charged gelatin dispersion 34a undergoes a purification step 36a in order to remove or neutralize trace amounts of positively charged minerals, ions or peptides. Purification step 36a comprises passing negatively charged gelatin dispersion 34a through an anion column whereby the positively charged impurities are removed from dispersion 34a. Following the purification step, the negative electrostatic charge of the gelatin is enhanced by passing a negative DC current through the dispersion 34a. The negative DC current has a voltage of about 10 mV and an amperage of about 2 A and is passed through dispersion 34a for a period of about 10 seconds.

The enhanced gelatin dispersion 38a is finally sent to a moisture removal and drying operation 40a wherein a powdered, electrostatically charged gelatin product of food grade quality is formed. Operation 40a first comprises the evaporation of a portion of the moisture of enhanced dispersion 38a under a vacuum thereby forming a gelatin concentrate. The concentrate is sterilized by exposure to superheated steam for not more than 10 seconds and then dried into a powder having a moisture content of about 12% by weight using a hot air spray dryer.

Alternatively, if gelatin with a positive electrostatic charge is desired, the pH of dispersion 18 is adjusted by the addition of phosphoric acid 32b to between about 2–3. This pH adjustment step causes the amino group of at least one of the amino acids from which gelatin is comprised to assume a positive charge. However, the carboxyl group of the amino acid remains electrostatically neutral. Therefore, the gelatin assumes an overall positive electrostatic charge.

After the pH adjustment step, the positively charged gelatin dispersion 34b undergoes a purification step 36b in order to remove or neutralize trace amounts of negatively charged minerals, ions or peptides. Purification step 36b comprises passing positively charged gelatin dispersion 34b through a cation column whereby the negatively charged impurities are removed from dispersion 34b. Following the purification step, the positive electrostatic charge of the gelatin is enhanced by passing a positive DC current through the dispersion 34a. The positive DC current has a voltage of about 10 mV and an amperage of about 2 A and is passed through dispersion 34b for a period of about 10 seconds.

The enhanced gelatin dispersion 38b is finally sent to a moisture removal and drying operation 40b wherein a powdered gelatin product of food grade quality is formed. Operation 40b first comprises the evaporation of a portion of the moisture of enhanced dispersion 38b under a vacuum thereby forming a gelatin concentrate. The concentrate is sterilized by exposure to superheated steam for not more than 10 seconds and then dried into a powder having a moisture content of about 12% by weight using a vacuum tray dryer. In this instance, a vacuum tray drier is preferred to a hot air spray drier because hot air drying may adversely affect the positive charge of the gelatin thereby having a neutralizing effect.

EXAMPLES

The following examples set forth preferred methods in accordance with the present invention. It is to be understood, however, that these examples are provided by way of illustration and nothing therein should be taken as a limitation upon the overall scope of the invention.

Example 1

In this example, gelatin having a negative electrostatic charge is extracted from pigskin. Approximately 4,000 lbs. of pigskin is ground to a particle size of less than about 1.5 mm using a $\frac{1}{16}$ in. plate. The ground pigskin is then mixed with water to form a slurry. The pH of the slurry is adjusted to 2.5 using sulfuric acid. The slurry is maintained under acidic conditions for up to 4 days. The slurry then undergoes three heating steps whereby the gelatin is extracted. Each heating step lasts about 60 minutes. The first extraction step involves heating the slurry to 145° F., the second to 165° F., and the third to 185° F. The heat denaturing of the collagen contained in the pigskin results in the unwinding of the polypeptide chains thereby releasing the gelatin.

After the gelatin is extracted, the pH of the gelatin dispersion is adjusted to 4.6, the isoelectric point of the gelatin, by the addition of sodium hydroxide. The gelatin dispersion is then filtered to remove suspended solid residues and then filtered again to remove protein impurities from the gelatin dispersion. Following the filtration steps, the pH of the gelatin dispersion is adjusted to 12 using sodium hydroxide.

The gelatin dispersion is passed through an anion column to remove trace amounts of positively charged minerals, ions, and peptides. Upon leaving the anion column, the dispersion is sent to an evaporation process operating under a vacuum thereby forming a gelatin concentrate which comprises 30% gelatin by weight. The gelatin concentrate is sterilized by exposing the concentrate to superheated steam at a temperature of 315° F. for 5 seconds. Once sterilized, the gelatin concentrate is spray dried at a temperature of 346° F. thereby recovering the gelatin in powder form. This process yields approximately 680 lbs. of gelatin having a negative electrostatic charge.

Example 2

In this example, gelatin having a positive electrostatic charge is extracted from pigskin. The pigskin is initially treated as described in Example 1 through the gelatin extraction and filtration stages. After filtration of the gelatin dispersion, the pH of the dispersion is adjusted to 2.5 using phosphoric acid. The gelatin dispersion is then passed through a cation column to remove trace amounts of negatively charged minerals, ions and peptides. After leaving the cation column, the gelatin is processed into powder form as in Example 1, with the exception that the gelatin concentrate is vacuum oven dried as opposed to spray dried. This process yields approximately 740 lbs. of gelatin having a positive electrostatic charge.

Example 3

In this example, gelatin having a negative electrostatic charge is extracted from pigskin. The process of this example is the same as that of Example 1 and includes the additional step of enhancing the gelatin's overall negative charge by passing a negative DC current through the gelatin dispersion after impurity removal in the anion column. A negative DC current at 10 mV and 2 A is passed through the gelatin dispersion for 10 seconds. The gelatin dispersion is then concentrated, sterilized and spray dried as in Example 1. This process yields about 650 lbs. of gelatin having a negative electrostatic charge.

Example 4

In this example, gelatin having a positive electrostatic charge is extracted from pigskin. The process of this example is the same as that of Example 2 and includes the additional step of enhancing the gelatin's overall positive charge by passing a positive DC current through the gelatin dispersion after impurity removal in the anion column. A positive DC current at 15 mV and 2 A is passed through the gelatin dispersion for 15 seconds. The gelatin dispersion is then concentrated, sterilized and vacuum oven dried as in Example 2. This process yields about 700 lbs. of gelatin having a positive electrostatic charge.

We claim:

1. A method of forming electrostatically charged gelatin comprising the steps of:
   forming an aqueous gelatin dispersion with previously isolated gelatin;
   adjusting the pH of said gelatin dispersion causing said gelatin to assume an electrostatic charge; and
   removing moisture from said adjusted gelatin dispersion thereby forming a concentrate of electrostatically charged gelatin having a water content of less than 70% by weight without first adding any neutralizing substance to said adjusted dispersion.

2. The method of claim 1, said pH adjustment step comprising adjusting the pH of said gelatin dispersion thereby causing said gelatin to assume a negative electrostatic charge.

3. The method of claim 2, said pH adjustment step comprising adjusting the pH of said gelatin dispersion to between about 10–12.

4. The method of claim 1, said pH adjustment step comprising adjusting the pH of said gelatin dispersion thereby causing said gelatin to assume a positive electrostatic charge.

5. The method claim 4, said pH adjustment step comprising adjusting the pH of said gelatin dispersion to between about 2–3.

6. The method of claim 1, further comprising the step of sterilizing said gelatin concentrate.

7. A method of forming electrostatically charged gelatin comprising the steps of:
   forming an aqueous gelatin dispersion with previously isolated gelatin;
   adjusting the pH of said gelatin dispersion causing said gelatin to assume an electrostatic charge;
   passing a DC electric current through said adjusted gelatin dispersion; and
   removing moisture from said adjusted gelatin dispersion thereby forming a concentrate of electrostatically charged gelatin without first neutralizing said adjusted dispersion.

* * * * *